United States Patent [19]

Arnon

[11] Patent Number: 4,757,530
[45] Date of Patent: Jul. 12, 1988

[54] ADAPTIVE HYBRID

[75] Inventor: Ephraim Arnon, Nepean, Canada

[73] Assignee: Northern Telecom Limited, Montreal, Canada

[21] Appl. No.: 901,988

[22] Filed: Sep. 2, 1986

Related U.S. Application Data

[63] Continuation of Ser. No. 610,040, May 14, 1984, abandoned.

[51] Int. Cl.[4] .............................................. H04B 3/03
[52] U.S. Cl. ..................................... 379/404; 379/403
[58] Field of Search ....... 179/170 R, 170 G, 170 NC, 179/16 F; 379/402, 403, 404, 399, 400

[56] References Cited

U.S. PATENT DOCUMENTS

| | | | |
|---|---|---|---|
| 4,096,362 | 6/1978 | Crawford | 379/403 |
| 4,178,569 | 12/1979 | Reutter et al. | 379/402 X |
| 4,246,582 | 1/1981 | Kondo et al. | 370/32 |
| 4,275,276 | 6/1981 | Rizzo | 379/403 |
| 4,278,848 | 7/1981 | Rizzo et al. | 379/403 |
| 4,368,361 | 1/1983 | Chung et al. | 379/3 |

FOREIGN PATENT DOCUMENTS 3034568  3/1982  Fed. Rep. of Germany .
2485842 12/1981 France .
1115216  5/1968  United Kingdom .

Primary Examiner—Jin F. Ng
Assistant Examiner—Randall S. Vaas
Attorney, Agent, or Firm—Thomas Adams

[57] ABSTRACT

An adaptive hybrid arrangement for interfacing a bidirectional communications channel with two unidirectional channels, especially for connecting a two-wire telephone line to a four-wire telephone trunk or repeater, comprises a hybrid having four ports. One port is for the two-wire or bidirectional channel, the second and third are for the unidirectional channels. A multi-element balancing network is connected to the fourth port, i.e. opposite to the port connected to the bidirectional channel. Correlation detection means detects correlation between a signal in one of the unidirectional channels and an error signal in the other. If correlation exists, adjusting means adjusts the balancing network so as to reduce such correlation.

6 Claims, 4 Drawing Sheets

ADAPTIVE HYBRID

The application is a continuation of application Ser. No. 610,040, filed May 14, 1984, now abandoned.

The invention relates to adaptive hybrids for interfacing a bidirectional communications channel with two oppositely-unidirectional channels and is especially, but not exclusively, applicable to adaptive hybrids for use in telephone systems.

In telephone systems and the like a hybrid is usually provided wherever it is necessary to segregate signal channels, for example by conversion from two-wire to four-wire transmission. Such conversion is necessary, for example, at repeaters, to enable amplification of the signals transmitted in opposite directions, and at channel banks.

Typically the hybrid has a first port connected to the bidirectional (two-wire) channel, second and third ports connected to the two unidirectional channels and a fourth port connected to a balancing network. The parameters of the balancing network are adjusted in dependence upon the characteristics of the bidirectional channel so as to minimize the signals passed between the second and third ports. In the case of a repeater, if the gain is sufficient oscillation (singing) may occur if the hybrid is not adequately balanced.

In a telephone system, the characteristics of the bidirectional (two-wire) channel may vary. For example, the channel may comprise one of a variety of cable types, lengths, terminations and may include a bridged tap which will affect its impedance.

In many applications it is sufficient merely to provide, say, two balancing networks and select which one is most appropriate. However, in more demanding applications, where gain is high, such as in line repeaters and digital channel banks, more precise balancing is necessary to achieve a high transhybrid loss.

One possible approach, known as "echo-cancellation", is to generate an error signal by means of, for example, a transversal filter, and subtract it from the actual signal. Such echo-cancellation systems are not entirely satisfactory because they use A-D and D-A conversion, which add noise. Also they usually require complex signal processing circuitry and have a relatively high power consumption.

An alternative approach is to use a manually-adjustable precision balancing network. Because the impedance to be balanced is complex, the balancing network has variable resistances and variable capacitances which are adjusted in accordance with prescription tables. To adjust these to balance the characteristics of the many different possible channels is very time-consuming and therefore expensive. It also depends upon the availability of good records for each channel, and being done manually, is expensive and tedious. It has also been proposed to inject test tones onto the channel and adjust the network. The use of test tones is not always acceptable.

An object of the present invention is to eliminate, or at least mitigate, the disadvantages of the aforementioned approaches.

According to the present invention, a hybrid arrangement for interfacing a bidirectional transmission/communications channel with two unidirectional channels comprises:

a hybrid having a first port for connection to said bidirectional channel, a second port for connection to one of said two unidirectional channels, a third port for connection to the other of said two unidirectional channels, and a fourth port for connection to a balancing network;

a balancing network connected to said fourth port; and correlation detection means for detecting correlation between a transmitted or first information signal in one of said two unidirectional channels and a receive or second information signal in said other of said two unidirectional channels; and adjustment means responsive to said correlation detection means for adjusting said balancing network so as to tend to reduce any such correlation.

In this specification, the term "information signal" is used to mean a signal carrying information, for example speech or data, which is to be conveyed from the transmitting party to the receiving party, as distinct from pilot tones which do not carry such information but are injected into a hybrid purely for test purposes.

In reducing such correlation, transhybrid loss is increased and hence the balance is improved.

An embodiment of the invention will now be described, by way of example only, with reference to the accompanying drawings, in which.

Figure 1:
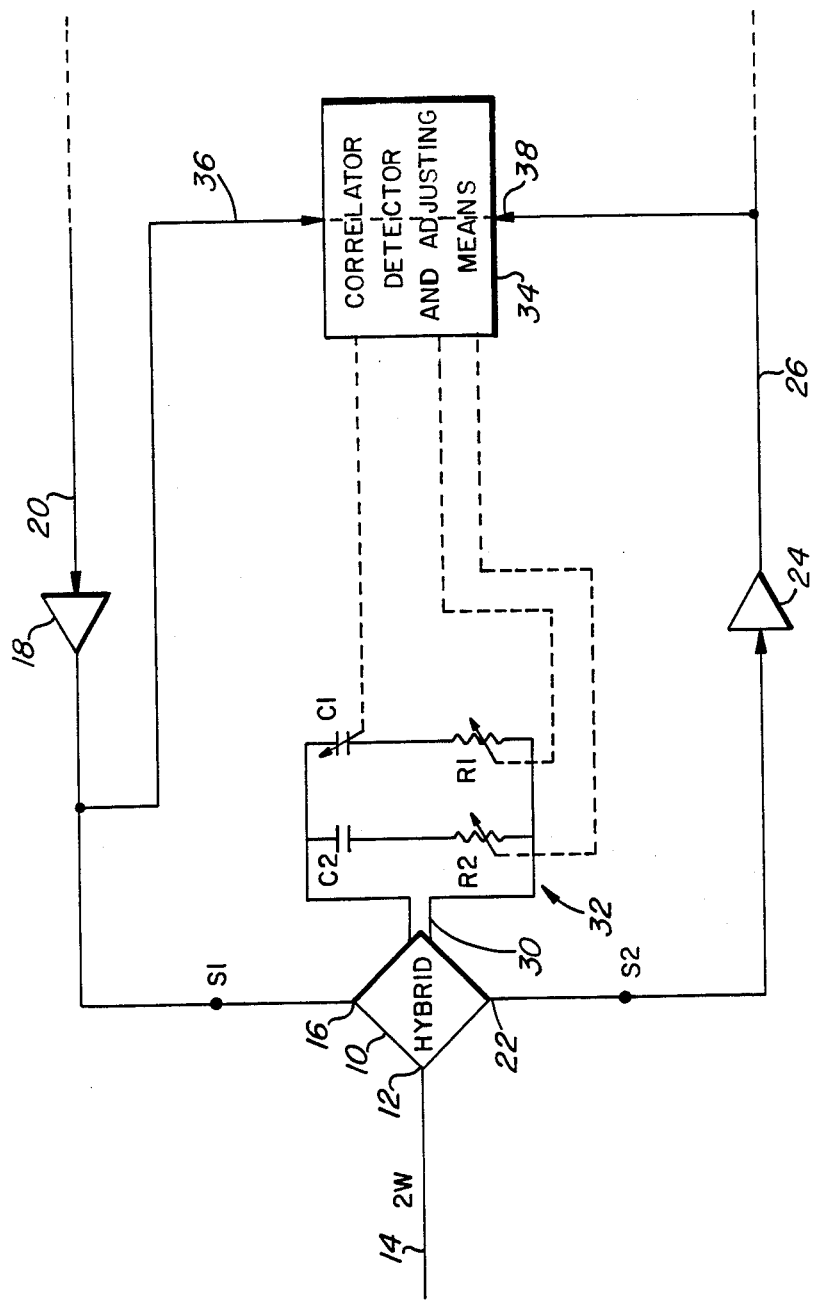
FIG. 1 is a block schematic diagram of an adaptive hybrid with a balancing network and means for automatically adjusting the network.

Referring to FIG. 1, a hybrid 10 has a first port 12 connected to a bidirectional transmission line, in the form of a two-wire line 14. A second port 16 of the hybrid 10 is connected by way of an amplifier 18 to a two-wire line 20. The amplifier 18 is arranged so as to convey signals only in the direction towards the hybrid 10. Thus the transmission line 20 is rendered unidirectional, and S1 at port 16 comprises mostly the outgoing unidirectional signal.

A third port 22 of the hybrid 10 is connected by way of an amplifier 24 to a two-wire transmission line 26 which is rendered unidirectional by amplifier 24 which conveys signals only away from the hybrid 10. A fourth port 30 of the hybrid 10, opposite port 12, is connected to a balancing network 32, which is adjustable by means of correlation detection means 34 which itself has two inputs 36 and 38 connected to the outputs of amplifiers 18 and 24, respectively.

Were the hybrid 10 to be part of a line repeater, a second similar hybrid arrangement would be provided, with its own balancing network and correlation detection means. Otherwise the transmission lines 20 and 26 might continue to be segregated as transmit and receive channels, perhaps connected to a channel bank. Usually, however, a similar hybrid would eventually be provided to return to a two-wire line at the far end of the connection.

If the hybrid 10 were not properly balanced, part of a signal S1 entering port 16 would appear at port 22 as a transhybrid signal. Following amplification by amplifier 24 the transhybrid signal would be transmitted along line 26. On arrival at the far-end hybrid the signal might "leak across" to generate a further transhybrid signal which would return via line 20 to amplifier 18. If the gain in the system is sufficient, the system can oscillate or "sing". The aim when balancing the hybrid is to achieve sufficient loss, known as "transhybrid loss", across the hybrid, and so reduce transhybrid signals. A suitable transhybrid loss figure for a line repeater hybrid is 25 to 35 dB.

In the hybrid arrangement shown in FIG. 1, adequate transhybrid loss is achieved by modifying the parameters of the balancing network 32 in dependence upon the degree of correlation between the signals at the respective outputs of amplifiers 18 and 24. Such correlation is determined by correlation-detection and adjusting means 34 which has inputs 36 and 38 from the aforementioned outputs of amplifiers 18 and 24, respectively. It will be appreciated that if the signal S2 comprises a signal component arriving from the two-wire line 14 and a transhybrid signal derived via the receive port 16 from amplifier 18, the transhybrid signal will result in correlation between signal S2 and S1. Therefore, the correlation-detector and adjusting means 34 is arranged to modify the balancing network 32 so as to reduce correlation between signals S1 and S2.

The signals involved generally will be complex analogue waveforms, such as voice signals, and the balancing network 32 will also be complex, in view of the complex nature of the impedance of the two-wire line 14. As shown in FIG. 1, one embodiment of the balancing network comprises two parallel arms, each comprising a resistor and capacitor in series. Both the resistors, R1 and R2, and the capacitor C1 in series with R1, are adjustable by means of the correlation detector and adjusting means 34. Capacitor C2, which is in series with R2, is not adjustable. The different parameters of the network will each affect a corresponding different part of the signal. The correlation-detection and adjusting means 34 is arranged to identify the nature of the correlation, to which one of the elements it relates, and to adjust the appropriate element of the balancing network.

Figure 2A:
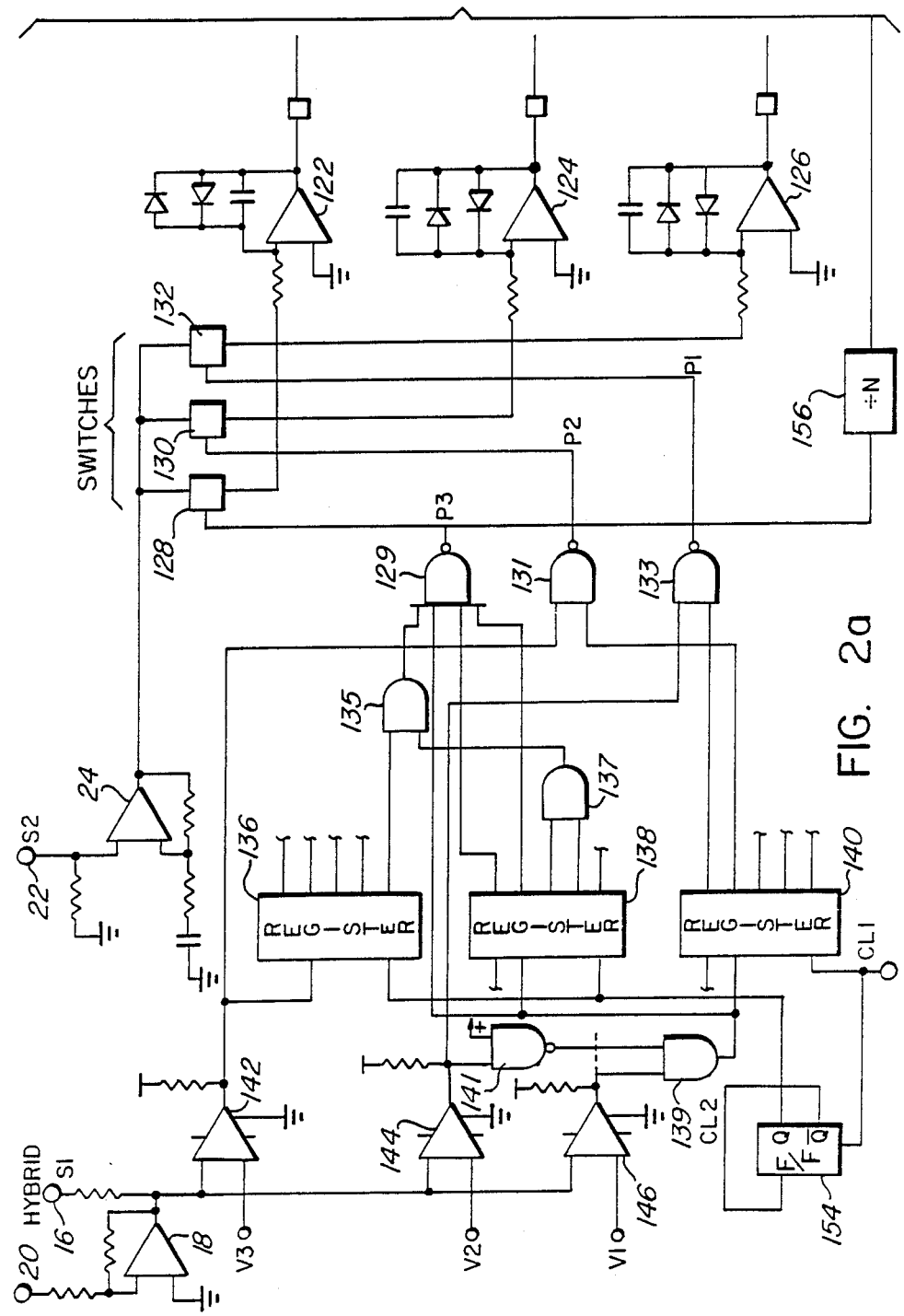
FIGS. 2a and 2b are a detailed diagram of the adaptive hybrid with means for adjusting three elements of the network.
Figure 2B:
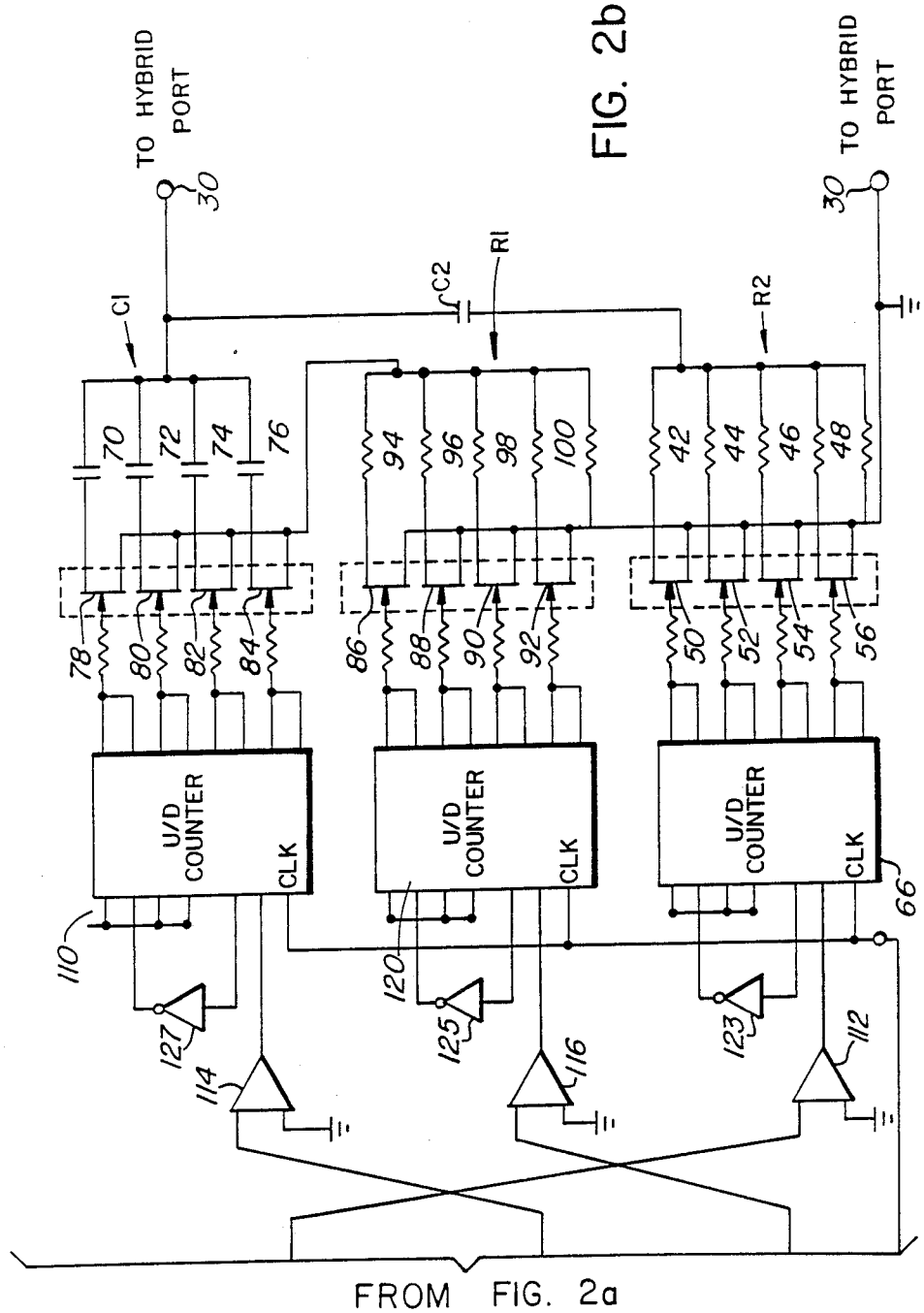

Referring now to FIG. 2, the correlation-detection and adjusting means 34 and balancing network 32 are shown in more detail. The balancing network 32 comprises capacitor C2 having one terminal connected to hybrid port 30 and its other terminal connected by way of resistor R2 to the other, grounded terminal of port 30. Resistor R2 actually comprises a bank of resistors 42, 44, 46 and 48 connected to the port 30 by field-effect transistors 50, 52, 54 and 56, respectively. The gates of transistors 50, 52, 54 and 56 are controlled by corresponding ones of the parallel outputs of an up/down counter 66.

The second R-C arm is also connected across pot 30. In this second arm, C1 is formed by a bank of four capacitors 70, 72, 74 and 76 connected in common to one terminal of port 30 and by a corresponding set of four field-effect transistors 78, 80, 82 and 84 to a common connection of a bank of resistors 94, 96, 98 and 100, respectively, which comprise R1. The latter set of resistors are connected by respective ones of a set of field-effect transistors 86, 88, 90 and 92 in common to the other terminal of hybrid port 30.

The gates of field-effect transistors 78, 80, 82 and 84 are controlled by the outputs of an up/down counter 110. The gates of field-effect transistors 86, 88, 90 and 92 are controlled in like manner by an up/down counter 120. Counters 66, 110 and 120 are clocked or updated at a relatively slow rate, for example 0.5 Hz. As the contents of the up/down counters 66, 110 and 120 vary, the corresponding field-effect transistors will be controlled so as to vary the total value of the associated elements of the balancing network 32. Thus as the contents of a counter change, different combinations of the four elements are connected in parallel, giving different overall values.

The counters 66, 110 and 120 have their up/down inputs connected by way of high gain amplifiers 112, 114 and 116 to the outputs of integrators 122, 124 and 126, respectively.

The integrators 122, 124 and 126 have oppositely-connected diode pairs 117, 119 and 121, respectively, connected between their inputs and outputs. These diodes serve as voltage limiters. The gain lost by employing the diodes is restored by the high gain amplifiers 112, 114 and 116. Additional inverting amplifiers 123, 125 and 127 connected across appropriate inputs of the counters 66, 110 and 120, respectively, serve as overflow limiters to stop each counter from returning to zero if its capacity is exceeded.

The inputs of the integrators are connected by corresponding ones of a set of switches 128, 130 and 132, to the output of amplifier 24. The switches 128, 130 and 132 serve to connect the integrators 122, 124 and 126 selectively to the output of amplifier 24, thus to apply to them the signal in the line 26 connected to hybrid port 22.

The switches 128, 130 and 132 are controlled by means of signal analyzer circuit which closes the switches to "sample" the signal in line 26 in dependence upon the waveshape of the signal at port 16 of the hybrid. The signal analyzer circuit comprises control means in the form of a combination logic array including three NAND gates 129, 131 and 133, the outputs of which control switches 128, 130 and 132, respectively. The array also comprises three AND gates 135, 137 and 139, respectively, and a fourth NAND gate 141.

In addition to the combination logic array, the signal analyzer comprises a set of three shift registers 136, 138 and 140, respectively, and a set of three comparators 142, 144 and 146, respectively. The parts of the signal analyzer are interconnected as shown in FIG. 2.

A divide-by-two flip-flop 154 provides a clock signal CL2 of 8 KHz from clock CL1 which is 16 KHz. It should be noted that shift register 140 is clocked at 16 KHz and shift registers 136 and 138 at 8 KHz.

Comparators 142, 144 and 146 each have one input (positive) connected to the output of amplifier 18 which feeds port 16 of the hybrid. The other inputs of the comparators 142, 144 and 146 are connected to voltage reference sources V3, V2 and V1, respectively.

Figure 3:
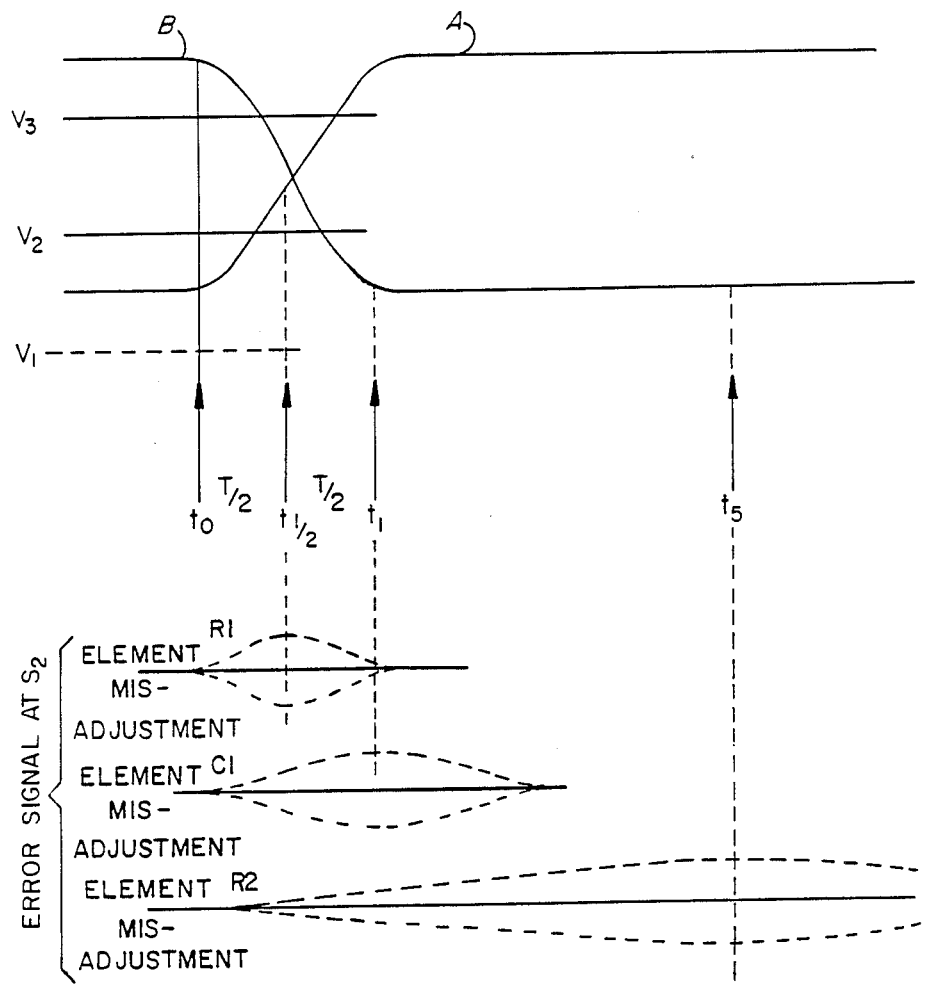
FIG. 3 illustrates operation of the adaptive hybrid.

The comparators 142, 144 and 146 serve to divide the amplitude domain of the input or line signal from amplifier 18 into four regions. The shift registers 136, 138 and 140 divide the time domain in five periods, each of 125 microseconds duration. The first period is sub-divided into two equal parts by virtue of shift register 140 being clocked at 16 KHz. These divisions are illustrated in FIG. 3, in which two curves of possible waveforms are shown. For adjusting elements R1 and C1, curve A is used. For element R2 curve B is used. In practice there is no difference in the results and, if preferred, the embodiment could be modified so that all elements were derived from the same curve, i.e. same polarity of signal.

NAND gate 133 performs a NAND function on the first of the parallel outputs of shift register 140, which is clocked at 16 KHz, and the output of comparator 144. The input to shift register 140 is the output of AND gate 139 which performs an AND function on the output of comparator 146 and the output of NAND gate 141 which derives one input from the output of comparator 144, its other input being connected to a positive supply so that it acts as an inverter. When NAND gate 133, therefore, detects a transition of the signal from between V1 and V2 to above V2 in a time period T/2 seconds, it closes switch 132 to adjust, if necessary, element R1 of the balancing network, i.e. resistors 94, 96, 98 and 100 by way of integrator 126.

NAND gate 131 performs a NAND function on the second output of shift register 140 and the output of comparator 142. When NAND gate 131 detects a transition of the signal from between V2 and V1 to above V3 in time period T seconds, it closes switch 130 to apply error signal, if any, to integrator 124. Integrator 124 controls adjustment of element C1 of the balancing network.

NAND gate 129 has four inputs and performs a NAND function upon the first two inputs of shift register 138, the output of AND gate 139 and the output of AND gate 135. Gate 135 performs an AND function upon the fifth stage output of shift register 136 and, via AND gate 137, upon the third and fourth outputs of shift register 138. When NAND gate 129 detects that the signal, represented this time by curve B in FIG. 3, has transited from above V3 to between V2 and V1 in a time period T seconds, and remained there for the next four time periods (T), it will close switch 128 resulting, if necessary, in adjustment of element R2, i.e. resistors 42, 44, 46 and 48, of the balancing network.

In operation, then, line (outgoing) signal is scanned and, when a waveform pattern of sufficient length and shape is detected, one of switches 128, 130 and 132 is closed for error or correlation measurement. Then the corresponding balance network element value is changed in such a direction as to minimize the error or correlation. In practice the error signal is integrated over a large number of samples so as to average out any non-correlated signal values that may occur due to far end signal. Thus the correlation sign is provided at the output of the corresponding integrator. The adjusting means, vis, the counter, then responds to such signal.

As previously mentioned, the signal analyzer divides the amplitude domain into four by means of comparators 142, 144 and 146, and the time domain by means of shift registers 136, 138 and 140. The combination logic or control means serves to sort out the waveforms that apply for each particular element of the balancing network and control application of the error signal to the integrator 122, 124 or 126 which controls that particular element value. When a particular shape is detected, the corresponding switch is closed, and the error signal applied to the corresponding integrator. The output of the integrator controls the direction of movement of the up/down counter so that the corresponding balance network element (C1, R1 and R2) increases or decreases at the next update clock time, CL3. The update clock rate is set so that the integrators have sufficient time to reflect the changes in the balancing conditions. This update clock is derived from one of the outputs of the signal analyzer, say the output of NAND gate 129, as indicated by ÷N counter 156 in FIG. 2. Then, if the outgoing signal disappears, or its character changes so that no proper pattern is detectable, no update clock is provided. As a result, the network coefficient are frozen at their most recent setting. This setting will only change, and adaptation resume, when the signal reappears or a proper pattern is detected again.

Random signals, for example band limited Gaussian noise, speech or V.F. data, contain a variety of waveforms that fall within the above-specified amplitude and time domain boundaries. Thus element adjustment occurs in non-deterministic random signal conditions. Any far-end signal, being uncorrelated with the outgoing signal would not affect the setting of the balance network elements.

Whilst the balancing network described herein is particularly suitable for telephone lines, other networks could be employed for telephone lines or other communications channels.

What is claimed is:

1. A adaptive hybrid arrangement for interfacing a bidirectional communications channel with two unidirectional channels comprising:
   a hybrid having a first port for connecton to said bidirectional channel, a second port for connection to one of said two unidirectional channels, a third port for connection to the other of said two unidirectional channels and a fourth port for connection to a balancing network;
   a balancing network connected to said fourth port;
   correlation detection means for detecting correlation between first information signals coupled to the hybrid in one of said two unidirectional channels, and second information signals coupled from the hybrid in said other of said two unidirectional channels;
   the correlation detection means including:
   comparator means for comparing said first information signal in said one of the two unidirectional channels with one or more thresholds, storage means for storing an output of the comparator means for one or more predetermined time periods, control means responsive to the comparator means and storage means for selecting a switching means;
   the switching means being responsive to said control means for applying said second information signal to an integrator means for integrating said second information signal over a plurality of said time periods; and
   adjusting means responsive to the integrator means for adjusting the value of a selected element of the balance network.

2. An adaptive hybrid arrangement as claimed in claim 1, wherein the means for adjusting the value of said selected element comprises an up/down counter updated by a clock signal derived from said control means whereby adjustment occurs only when said first information signal has a predetermined pattern.

3. An adaptive hybrid arrangement as claimed in claim 2, wherein said selected element of said balancing network comprises a plurality of components connected in parallel by a corresponding plurality of transistors, each of said plurality of transistors being controlled by a respective output of said up/down counter.

4. An adaptive hybrid arrangement as claimed in claim 1, wherein the balancing network has three adjustable elements comprising a first resistance, a second resistance and a capacitance, said control means being arranged to select said first resistance for adjustment when said first information signal crosses from below to above a middle threshold in a time period of a prescribed time interval, and to select the capacitance for adjustment when said first information signal crosses from below the middle threshold to above a higher threshold in a time period double said prescribed time interval.

5. An adaptive hybrid as claimed in claim 4, wherein said control means is operative to select said second resistance for adjustment when said first information signal crosses from above said higher threshold to below said middle threshold in a time period equal to said prescribed time interval, and remains below said middle threshold for a time period equal to several said prescribed time intervals.

6. An adaptive hybrid a claimed in claim 4, wherein said control means is operative to select said second resistance for adjustment when said first information signal crosses from below said middle threshold to above said higher threshold in a time period equal to said prescribed time interval, and remains above said higher threshold for a time period equal to several said prescribed time intervals.

* * * * *